(12) United States Patent
Modarres et al.

(10) Patent No.: US 9,524,030 B2
(45) Date of Patent: Dec. 20, 2016

(54) HAPTIC FEEDBACK FOR INTERACTIONS WITH FOLDABLE-BENDABLE DISPLAYS

(71) Applicant: Immersion Corporation, San Jose, CA (US)

(72) Inventors: Ali Modarres, San Jose, CA (US); Vincent Levesque, Montreal (CA); Danny Grant, Laval (CA); Juan Manuel Cruz-Hernandez, Montreal (CA)

(73) Assignee: Immersion Corporation, San Jose, CA (US)

( * ) Notice: Subject to any disclaimer, the term of this patent is extended or adjusted under 35 U.S.C. 154(b) by 238 days.

(21) Appl. No.: 14/222,303

(22) Filed: Mar. 21, 2014

(65) Prior Publication Data

US 2014/0320393 A1    Oct. 30, 2014

Related U.S. Application Data

(60) Provisional application No. 61/816,605, filed on Apr. 26, 2013.

(51) Int. Cl.
*G06F 3/041* (2006.01)
*G06F 3/01* (2006.01)
(Continued)

(52) U.S. Cl.
CPC ............. *G06F 3/017* (2013.01); *G06F 1/1641* (2013.01); *G06F 1/1652* (2013.01); *G06F 3/016* (2013.01);
(Continued)

(58) Field of Classification Search
None
See application file for complete search history.

(56) References Cited

U.S. PATENT DOCUMENTS

| 2004/0008191 A1 | 1/2004 | Poupyrev et al. |
| 2010/0056223 A1 | 3/2010 | Choi et al. |

(Continued)

FOREIGN PATENT DOCUMENTS

| KR | WO2012108668 | * 8/2012 | .......... G06F 1/1616 |
| WO | 2013004919 A1 | 1/2013 | |

OTHER PUBLICATIONS

Johan Kildal, "Tangible 3D Haptics on Touch Surfaces: Virtual Compliance", CHI 2011, Interactivity 2 Open, May 7-12, 2011, Vancouver, BC, Canada.
(Continued)

*Primary Examiner* — Joseph Haley
*Assistant Examiner* — Ifedayo Iluyomade
(74) *Attorney, Agent, or Firm* — Miles & Stockbridge P.C.

(57) ABSTRACT

A flexible device includes a bendable-foldable display that has bendable flaps connected by a hinge. The display has sensors for detecting a folding characteristic between the at least two flaps and for detecting a bending characteristic in at least one flap. The display has a haptic system with haptic output devices, where the haptic system receives input from the sensors indicating deformation of the bendable-foldable display device. A flexible device also includes bendable, foldable, or rollable displays that have sensors and actuators to augment user interaction with the device. Based on one or more measurements provided by the input, the haptic system interprets the input to determine deformation characteristics of the bendable-foldable display device. The haptic system generates haptic feedback based on the deformation characteristics.

29 Claims, 11 Drawing Sheets

(51) Int. Cl.
*G06F 3/0487* (2013.01)
*G06F 1/16* (2006.01)
*G06F 3/0483* (2013.01)
*H04M 1/02* (2006.01)

(52) U.S. Cl.
CPC .......... *G06F 3/0483* (2013.01); *G06F 3/0487* (2013.01); *H04M 1/0268* (2013.01)

(56) References Cited

U.S. PATENT DOCUMENTS

| | | | |
|---|---|---|---|
| 2012/0229400 A1 | 9/2012 | Birnbaum et al. | |
| 2013/0201115 A1 | 8/2013 | Heubel | |
| 2013/0265260 A1* | 10/2013 | Seo | G06F 3/041 345/173 |
| 2013/0321340 A1* | 12/2013 | Seo | G06F 1/1641 345/174 |

OTHER PUBLICATIONS

Marcelo Coelho et al., "Shape-changing interfaces", Personal and ubiquitous computing, Springer Verlag, Lo, vol. 15, No. 2, Jul. 29, 2010, pp. 161-173.

Sean Follmer et al., "Jamming User Interfaces: Programmable Particle Stiffness and Sensing for Malleable and Shape-Changing Devices", Proceedings of the 25th Annual ACM Symposium on User Interface Software and Technology, UIST '12, Jan. 1, 2012, 10 pages.

Anne Roudaut et al., "Designing and Developing Self-Actuated Flexible Touch Screens", MobileHCI'12, Sep. 21-24, 2012, San Francisco, CA, USA.

Jun-ichiro Watanabe et al., "Bookisheet: Bendable Device for Browsing Content Using the Metaphor of Leafing Through the Pages", 10th International Conference on Ubiquitous Computing (UBICOMP 2008); Seoul, Korea; Sep. 21-24, 2008, ACM, New York, NY, USA, vol. 344, Jan. 1, 2008, pp. 360-369.

* cited by examiner

HAPTIC FEEDBACK FOR INTERACTIONS WITH FOLDABLE-BENDABLE DISPLAYS

CROSS REFERENCE TO RELATED APPLICATIONS

This application claims priority of Provisional Patent Application Ser. No. 61/816,605, filed on Apr. 26, 2013, the contents of which is hereby incorporated by reference.

FIELD

One embodiment is directed to a haptically-enabled device. More particularly, one embodiment is directed to a haptically-enabled foldable-bendable display.

BACKGROUND INFORMATION

Electronic device manufacturers strive to produce a rich interface for users. Conventional devices use visual and auditory cues to provide feedback to a user. In some user interfaces, kinesthetic feedback (such as active and resistive force feedback) and/or tactile feedback (such as vibration, texture, and heat) are also provided to the user, more generally known collectively as "haptic feedback" or "haptic effects." Haptic feedback can provide cues that enhance and simplify the user interface. For example, vibration effects, or vibrotactile haptic effects, may be useful in providing cues to users of electronic devices to alert the user to specific events, or provide realistic feedback to create greater sensory immersion within a simulated or virtual environment.

In order to generate vibration or other effects, many devices utilize some type of actuator or haptic output device. Known actuators used for this purpose include an electromagnetic actuator such as an solenoid actuator, an Eccentric Rotating Mass ("ERM") actuator in which an eccentric mass is moved by a motor, a Linear Resonant Actuator vibration motor ("LRA"), electro-active polymer actuator, or a piezoelectric actuator, etc. Kinesthetic actuators may be used to provide haptic feedback through mechanical movement of a device.

SUMMARY

One embodiment is a bendable-foldable display with at least two flaps connected by a hinge, wherein each flap is bendable. The display has sensors for detecting a folding characteristic between the at least two flaps and for detecting a bending characteristic in at least one flap. The display has a haptic system with haptic output devices, where the haptic system receives input from the sensors indicating deformation of the bendable-foldable display device. Based on one or more measurements provided by the input, the haptic system interprets the input to determine deformation characteristics of the bendable-foldable display device. The haptic system generates haptic feedback based on the deformation characteristics.

One embodiment is a flexible display that is at least bendable, foldable, or rollable. The display has sensors for detecting a deformation or attempted deformation of the display. The display includes a haptic system with one or more haptic output devices. The haptic system, receives input from the one or more sensors indicating deformation of the flexible display device. Based on the input, the haptic system interprets the input to determine deformation characteristics of the flexible display device. The haptic system generates haptic feedback based on the deformation characteristics.

DETAILED DESCRIPTION

Figure 1:
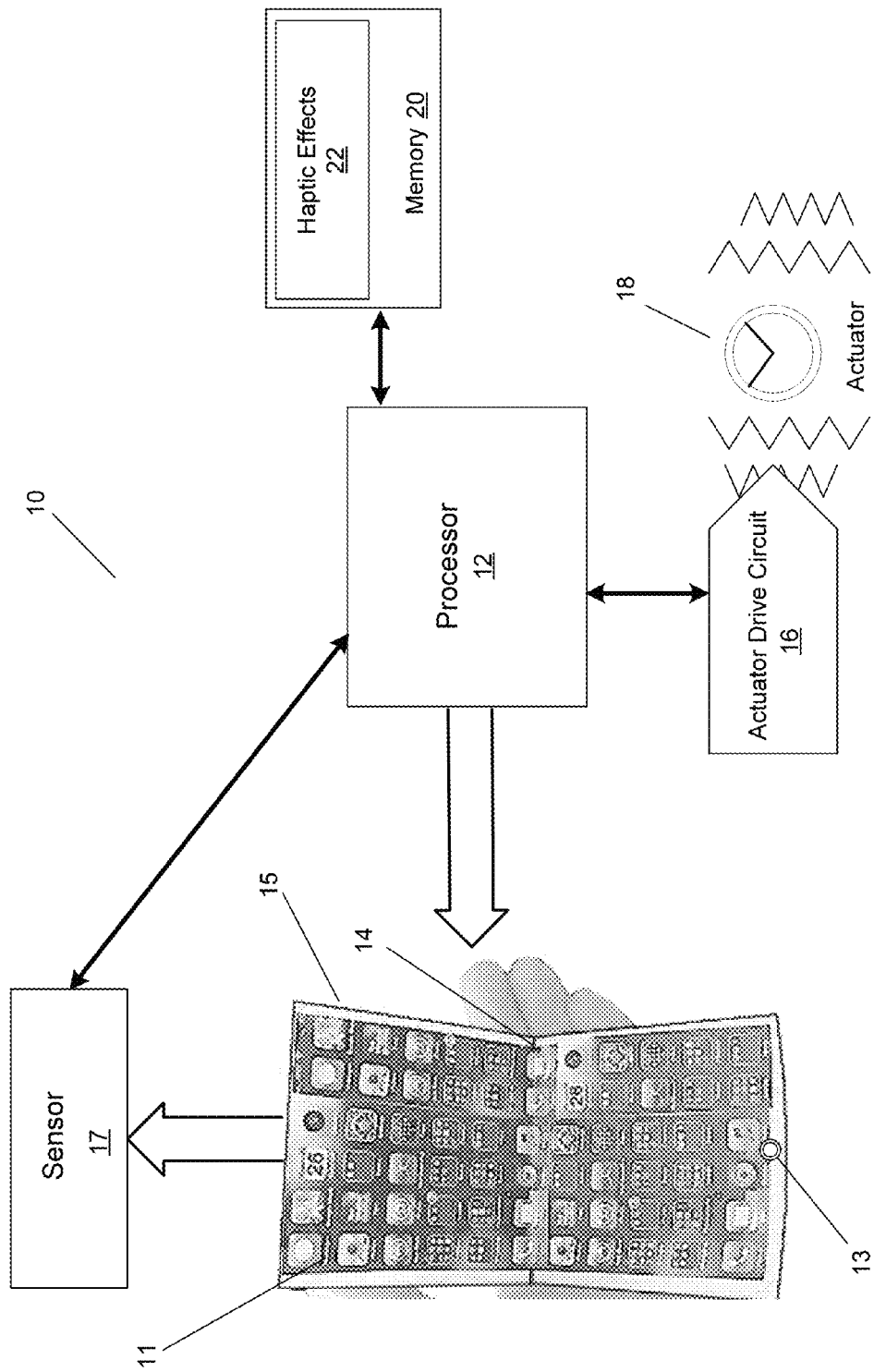
FIG. 1 is a diagram of a haptically-enabled system in accordance with one embodiment of the present invention.

Flexible displays are one of the most anticipated features of the next generation of smart phones, and have attracted a lot of attention in industry and academia during the past years. Flexible displays can enable a wide array of interactions. Foldable displays can have a seamless hinge or the like without causing a break in pixel presentation in a display. Rollable displays can either be flexible or conform to a particular curved shape. Rollable displays can also be understood as a bendable display in a single direction. Haptic feedback can be incorporated into these devices.

One embodiment is a system that provides haptic feedback associated with gestures and manipulation detected on a simultaneously foldable and bendable display device. A user can interact with an application running on the device by deforming the display, including by bending or warping one or more flaps or by changing the angle of the opening between the flaps. The system can characterize the deformation to interpret it into a user's action or gesture and provide an appropriate haptic feedback response. In one embodiment, for a gesture similar to flipping the page of a book in an e-reader application, the display can change to the next page and haptic feedback can provided to signify the page was changed on the display. In one embodiment, for a gesture similar to fanning a book's edge, the display can change to a page that is multiple pages away from the current page and haptic feedback can be provided to signify that multiple pages were passed prior to displaying the changed page. In one embodiment, kinesthetic feedback may make the bendable surface more rigid or the bendable surface may be naturally fairly rigid. Thus, a user can apply pressure without actual deformation occurring. The sensory system can be capture the force/pressure applied by the user and still provide a vibrotactile or other type of "haptics response" to such interactions by the user, i.e. force applied but not to the point of deformation.

In another embodiment, the system can present multiple objects side by side, on each flap of the bendable-foldable display. The system can use physical property information for the presented objects to provide kinesthetic feedback in response to a user interacting with the flaps to change the bendability (stiffness) characteristics of the display according to the physical property information of the objects.

In another embodiment, for a gesture similar to the closing of a book, the system can detect the action of closing the flaps together and prior to the complete closing of the flaps, cause the flaps to close and provide a haptic feedback of a snapping sensation, as of a book closing. In one embodiment, for a gesture similar to the opening of a book, the system can detect the action of opening the flaps apart and prior to the complete opening of the flaps, cause the flaps to open and provide a haptic feedback of a snapping sensation, as of a book opening.

Another embodiment is a system that provides augmented haptic feedback associated with gestures and manipulation detected on a flexible display. Enhancement of the haptic experience can be accomplished by augmenting the natural haptics related to continuous (analogue) deformation input dimensions with flexible displays through programmable vibrotactile and kinesthetic haptics.

Another embodiment is a system that provides kinesthetic haptic feedback associated with a flexible display to adjust the elasticity or deformability of the display based on the target interaction. Some interactions and functionalities may require the screen to be stiffer, or even rigid, while others are better facilitated by higher flexibility/softness of the interface. Embodiments describe a programmable haptic stiffness control mechanism to adjust the elasticity or deformability of the display depending on the target interaction.

Another embodiment is a system that provides shape changing functions of a flexible display. The purposes for taking a particular shape can include the ability to take the form that is more appropriate for a certain functionality or application and thus facilitates the user interactions with the interface; to display certain information through its geometric shape; to enable functionalities that are only feasible with a certain physical shape; or in case the device is serving as a physical representation of a virtual object, to deliver a more realistic simulation of the target object by mimicking its shape.

FIG. 1 is a block diagram of a haptically-enabled system 10 in accordance with one embodiment of the present invention. System 10 includes a touch sensitive foldable-bendable surface 11 or other type of user interface mounted within a housing 15, and may include mechanical keys/buttons 13 and a hinge 14 between the two flaps. Internal to system 10 is a haptic feedback system that generates vibrations on system 10. In one embodiment, the vibrations are generated on touch surface 11.

The haptic feedback system includes a processor or controller 12. Coupled to processor 12 are a memory 20 and an actuator drive circuit 16, which is coupled to an actuator 18. Actuator 18 can be any type of Direct Current ("DC") motor, including without limitation an Eccentric Rotating Mass ("ERM"), a Linear Resonant Actuator vibration motor ("LRA"), a piezoelectric motor, or a solenoid actuator. In addition to or in place of actuator 18, system 10 may include other types of haptic output devices (not shown) that may be non-mechanical or vibrotactile haptics devices such as devices that generate electrostatic friction ("ESF"), ultrasonic surface friction ("USF"), devices that induce acoustic radiation pressure with an ultrasonic haptic transducer, devices that use a haptic substrate and a flexible or deformable surface or shape changing devices and that may be attached to a user's body, devices that provide projected haptic output such as a puff of air using an air jet, devices that provide electrical muscle stimulation, etc.

Processor 12 may be any type of general purpose processor, or could be a processor specifically designed to provide haptic effects, such as an application-specific integrated circuit ("ASIC"). Processor 12 may be the same processor that operates the entire system 10, or may be a separate processor. Processor 12 can decide what haptic effects are to be played and the order in which the effects are played based on high level parameters. In general, the high level parameters that define a particular haptic effect include magnitude, frequency, and duration. Low level parameters such as streaming motor commands could also be used to determine a particular haptic effect. A haptic effect may be considered "dynamic" if it includes some variation of these parameters when the haptic effect is generated or a variation of these parameters based on a user's interaction.

Processor 12 outputs the control signals to actuator drive circuit 16, which includes electronic components and circuitry used to supply actuator 18 with the required electrical current and voltage (i.e., "motor signals") to cause the desired haptic effects. In instances where the haptic effects correspond to the playback of a multimedia file, such as a video file, processor 12 may provide the haptic control signal to the haptic drive circuit. System 10 may include more than one actuator 18, and each actuator may include a separate drive circuit 16, all coupled to a common processor 12. Memory device 20 can be any type of storage device or computer-readable medium, such as random access memory ("RAM") or read-only memory ("ROM"). Memory 20 stores instructions executed by processor 12. Among the instructions, memory 20 includes a haptic effects module 22 which are instructions that, when executed by processor 12, generate drive signals for actuator 18 that provide haptic effects, as disclosed in more detail below. Memory 20 may also be located internal to processor 12, or any combination of internal and external memory.

Touch surface 11 recognizes touches, such as those provided by a user, and may also recognize any of the position, pressure magnitude, and duration of touches on the surface. The data corresponding to the touches is sent to processor 12, or another processor within system 10, and processor 12 interprets the touches and in response generates haptic effect signals. Touch surface 11 may sense touches using any sensing technology, including capacitive sensing, resistive sensing, surface acoustic wave sensing, pressure sensing, optical sensing, etc. Touch surface 11 may sense multi-touch contacts and may be capable of distinguishing multiple touches and the location of the touches that occur at the same time. Touch surface 11 may be a touchscreen that generates and displays images for the user to interact with, such as keys, dials, etc., or may be a touchpad with minimal or no images.

System 10 may include a variety of sensors, such as sensor 17, for sensing interactions with the foldable-bendable display shown in FIG. 1 including, among others: strain gauge sensors to measure the deformation magnitude during interactions, force sensing resistor ("FSR") sensors to measure the force/stress applied to the flexible display structures, multi-touch touch sensors to detect the location of single or multiple touch inputs in a touch-enabled display, multi-touch pressure sensors to measure the pressure applied under each touch location, temperature/humidity/atmospheric pressure sensors to capture environmental conditions, an accelerometer/gyroscope/magnetometer to characterize the motion, velocity, acceleration and orientation of the display, a microphone to capture a user's voice command or environmental audio information, and wireless transmitters to receive/transmit information from/to other devices wirelessly. The data corresponding to sensor 17 is sent to processor 12, or another processor within system 10, and processor 12 interprets the sensor data and in response generates haptic effect signals.

In addition to the actuators discussed above, system 10 may include a variety of actuators for providing vibrotactile or kinesthetic feedback including flexible, semi-rigid, or rigid actuators, including Electro Active Polymer ("EAP") actuators, smart fluids actuators, rheological fluidic actuators, Macro-Fiber Composite ("MFC") actuators, Shape Memory Alloy ("SMA") actuators, piezo actuators, and Micro-Electro-Mechanical System ("MEMS") actuators.

System 10 may be a handheld device, such a cellular telephone, personal digital assistant ("PDA"), smartphone, computer tablet, gaming console, vehicle based interface, etc., or may be any other type of foldable-bendable device that includes a haptic effect system that includes one or more actuators. The user interface may be a touch sensitive surface, or can be any other type of user interface such as a mouse, touchpad, mini-joystick, scroll wheel, trackball, game pads or game controllers, etc. In embodiments with more than one actuator, each actuator that has rotational capability may have a different rotational capability in order to create a wide range of haptic effects on the device, for example each actuator can be controlled individually; also some rotational actuators have their axis of rotation at an angle to the axis of rotation of other rotational actuators. Likewise, in embodiments with multiple actuators with other capabilities, each actuator can be controlled individually to exhibit a wide range of haptic effects on the device.

In addition to providing user interfacing haptic effects, system 10 may provide statically generated haptic effects for playback in system 10 along with, for example, a video or audio file.

Flexible displays in general allow for a wide array of novel interactions by taking advantage of deformation as an additional information entry mechanism. However, the uniform/continuous feedback resulting from deformation interactions with flexible displays may not provide intuitive metaphors that relate events occurring digitally to physical interactions from a non-digital space. In other words, users do not typically interact in a non-digital space with small flat objects of the size of phones and tablets, as opposed to actual books and magazines. Embodiments offer a system for compelling user interactions and additional information about the digital environment to the user through haptics communication channels. Embodiments expand the user interface design space, enhance the interaction experience with flexible displays, and render deformation-based gestures more intuitive and natural. Moreover, embodiments provide an effective way to translate and deliver information about the digital world in the form of haptics.

Rather than a single surface flexible display, simultaneously foldable and bendable flexible displays consist of two or more "flaps" (each of the subcomponents of flexible displays) which can revolve around single or multiple hinges relative to the adjacent flaps, while each flap can also bend/flex (deform locally). The characteristic of being foldable and bendable at the same time enables metaphors that simulate specific user interaction scenarios in real life. Interactions with books represent one of the most relevant examples of this category. For example, while the page "flip" gesture is the result of the "bendability" (local flexibility) of the paper, each single page or collection of pages will go through a folding motion around the main spine (hinge) of the book. Embodiments provide methods of using haptics feedback to enhance and enrich user interface interactions with simultaneously bendable and foldable class of displays. Thus, exploitation of programmable vibrotactile and kinesthetic haptics to augment interactions with such displays can be achieved by introducing haptics control and haptic augmentation of both folding and local bending/flexing degrees of freedom of the display. Introducing tactile feedback to increase realism of interaction as well as adding an additional tactile information layer provides users of these devices the ability to interact with their devices more organically.

Particular embodiments are now discussed which can exploit programmable vibrotactile and kinesthetic haptics to augment interactions with bendable foldable displays and draw on metaphors from non-digital experiences of users.

Figure 2:
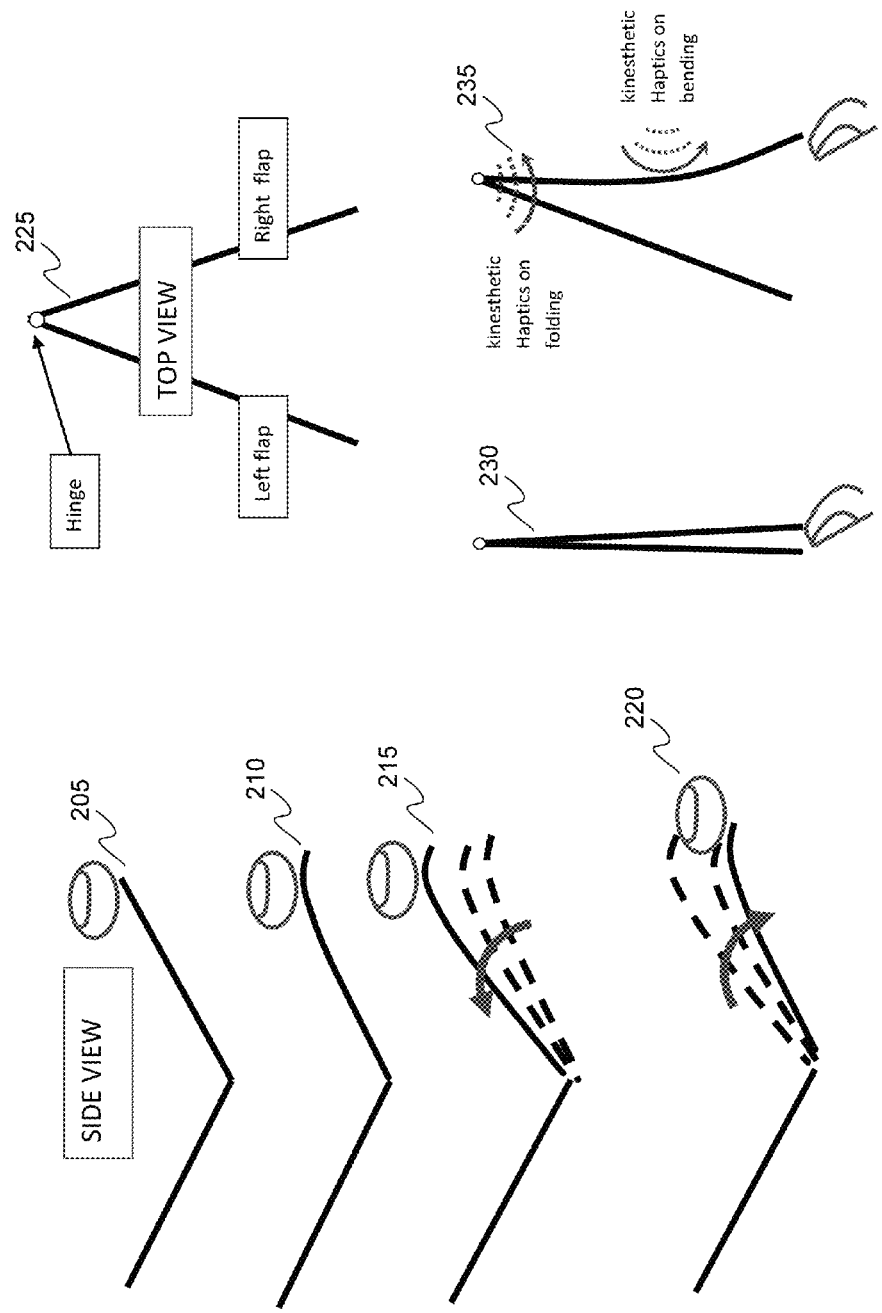
FIG. 2 illustrates an action associated with a deformation characteristic in one embodiment.

The action of turning the page of a real book consists of gradually bending (bendability) the page's corners or edge, while revolving (foldability) it around the spine at the same time. In a book the tactile sensation of the interaction depends on the page material/type and thickness, as well as the type of binding. In one embodiment, as depicted in FIG. 2 a user is reading an e-book on a simultaneously foldable and bendable flexible display, consisting of two flexible flaps. In order to "flip" the page of the e-book, the user slightly bends the lower right corner of the right flap of the display.

FIG. 2 illustrates an action associated with a deformation characteristic in one embodiment. A deformation characteristic is an interpretation of the deformation of the foldable-bendable display. A deformation characteristic can include the position of the hinge between the bendable flaps and can also include the bending state of the flaps. A deformation characteristic can include raw data associated with sensors measuring the properties of the hinge position or bending state. A deformation characteristic can be a determined state of the bendable-foldable display by interpreting sensor data into a form that may have more generalized meaning, such as an interpretation that the foldable-bendable display is "slightly open, right flap bent strongly." A deformation characteristic can also be an interpretation of an action or gesture, such as can be determined by comparing sequential sensor readings to interpret the sensor readings as "slightly open, opening slowly, right flap strongly bent, right flap bend increasing."

Continuing with FIG. 2, the left side of FIG. 2, elements 205, 210, 215, and 220 illustrate the side view of a foldable-bendable device with two flexible flaps. For a user reading a book on the device, to "flip" the page, at 205, a user's finger comes in contact with the edge of the device at either a corner or in the middle of the edge. At 210, the user's finger begins to apply pressure at the edge, causing a deformation in the bendable surface. At 215, the user's finger applies sideways pressure in the direction of the hinge of the foldable-bendable display, slightly closing the device and further increasing the bend radius. The user's finger can release the edge of the device. The user's interaction from 205 through 215 results in different states of deformation of the foldable-bendable device. A particular sequence of deformations, such as those provided in 205, 210, and 215, can identify a particular gesture or interaction the user is having with the foldable-bendable device. They system can determine from the sequence of deformations which haptic feedback to provide. For example, the system can characterize the deformation sequence by interpreting the parameters received by sensors, such as sensor 17, to represent a page flip gesture from a user. The system can provide haptic feedback for the page flip gesture, providing a tactile experience for flipping a page on an e-reader application, and at 220, after the page flip bring the flap back to its original position from before the page flip. Particular details for providing the haptic feedback are discussed in detail below.

Elements 225, 230, and 235 illustrate a user's action from a top view perspective. Element 225 shows the foldable-bendable device with a hinge, left flap, and right flap. At 230, the device is shown with a narrow or small opening angle between the two flaps. At 235, a user's gesture puts pressure on the edge of the device to cause a bending of one flap and a rotation on the opening angle, increasing the opening between the flaps. These two movements taken together is a deformation sequence that can be characterized to determine appropriate haptic feedback.

During this page-flip interaction, a kinesthetic haptic actuator can control the motion of the flap in a way that it not only bends but also slightly revolves around the display's hinge, simulating a realistic interaction similar to a real book page flip. Programmable kinesthetic haptic, through spatiotemporal control of stiffness, can ensure that the user receives appropriate and realistic tactile feedback during both the bending and folding motion of the flap. In some embodiments, the perceived resistance/stiffness of the bending/folding flap can be modulated to represent physical properties of the book/paper, such as the type of the binding, paper type/thickness, type of the media (book, newspaper, thin magazine, etc.) or other metaphorical information, such as reaching the end of a chapter or end of the book. Further, after the page content is updated (page flip has taken place), the haptic controller can bring back the right flap to its original position, as depicted in 220. Bringing the right flap back to its original position can be triggered either by the user through a certain gestural input (e.g., user starts to lift his finger off the flap), or be done automatically as soon as the page content has been updated to the next page on the graphical display. Thus, the combination of tactile feedback on bending and folding can increase the intuitiveness and realism of the interaction and increase the information communication bandwidth.

In another embodiment of the invention, the user can exploit a bending/folding gesture to quickly browse or "leaf" through the pages of an e-book. The action of leafing through a real book involves fanning the pages of the book through a simultaneous bending and folding technique with the book, while keeping pressure on the edge of the book, but varying the arch of bending and the angle between the left and right pages of the book.

Figure 3:
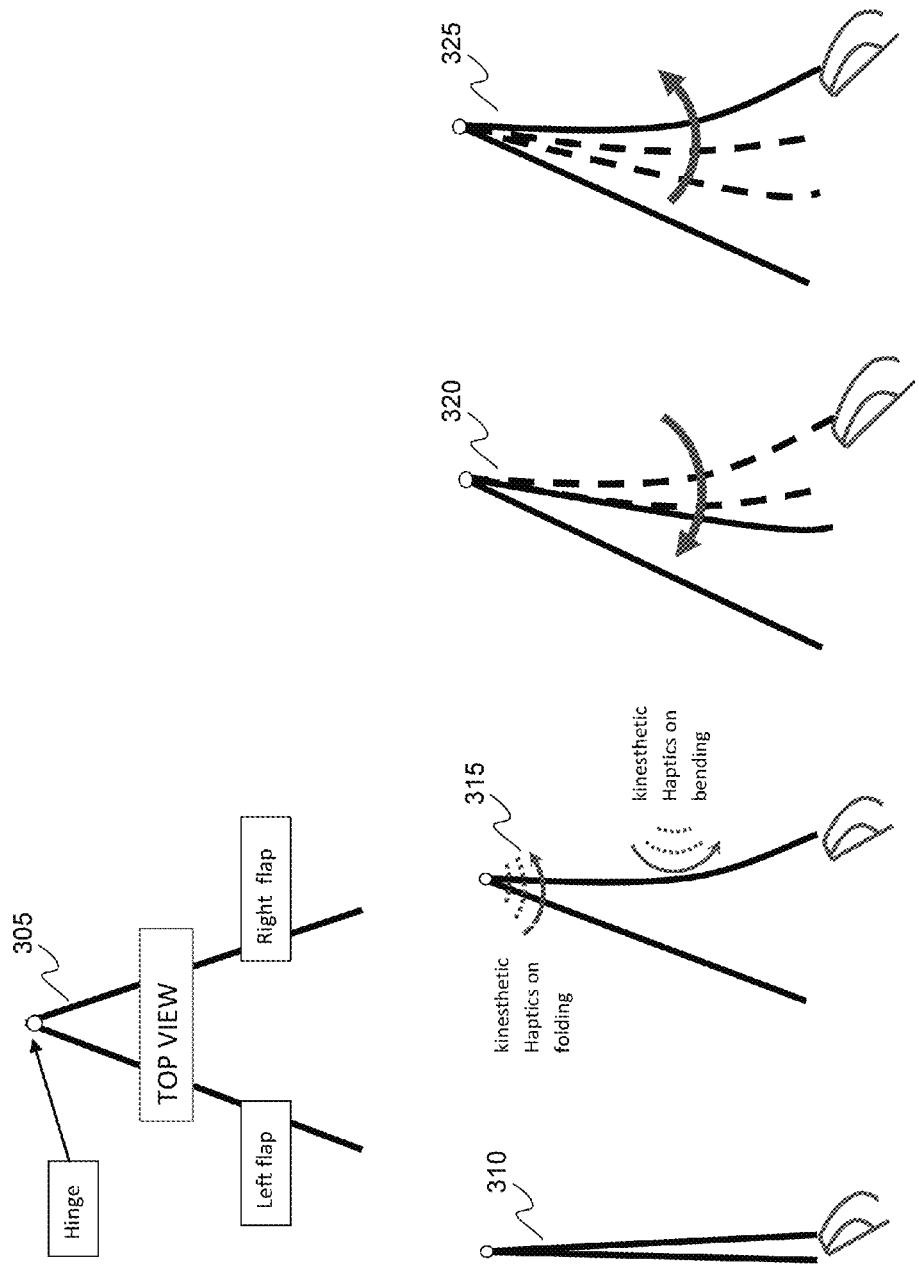
FIG. 3 illustrates an action associated with a deformation characteristic in one embodiment.

FIG. 3 illustrates an action associated with a deformation characteristic in one embodiment. At 305, the top view perspective of a foldable-bendable display is depicted with a hinge, a left flap, and a right flap. At 310, in order to leaf/browse through the pages of the e-book, the user may start with the foldable display flaps almost closed (flaps only slightly apart), and then attempt to slightly bend the right flap (similar to the interaction with a real book). At 315, as the user is folding/bending the display open, similar to what was explained in connection with FIG. 2, the haptic controller ensures a realistic haptic sensation similar to bending a real book. At 320, the user slightly bends and then releases the flap. Upon being released, the flap moves away (with a controlled bending and folding motion) from user's finger until the contact between finger and flap is lost. At 325, a haptics controller brings the flap back to the position right before it was released, in a way that it touches user's finger again. The flap repeatedly (and automatically) does this back and forth motion. In each repetition the flap slightly touches user's finger, while each instance of finger-page contact represents a single (or possibly multitude of pages) browsed through. The haptic creates a sensation that would feel similar to pages of a book slipping from under the finger. Thus, browsing or leafing through pages is another relevant metaphor that can be effectively emulated and haptically augmented to enrich the interaction based on the described haptic feedback scheme.

In some embodiments, at 320, rather than releasing the flap, the user can maintain contact with the flap. The rate that pages change from one page to the next can be controlled by increasing or decreasing the bend of the flap. As the bend radius decreases (increasing the bend), the rate of the page flip increases. The opening angle between the two flaps can also be used to define how quickly the pages change on the screen. At 325, instead of the flap coming back to make contact, a detent along the edge can house an actuator to brush the fingertip, providing a feeling of pages slipping past the fingertip.

In some embodiments, at 325 when the haptic controller brings the flap back to the position right before it was released, it does not touch the user's finger again. Pages can cease flipping when contact is not made. Pages can flip until the user interacts with the device again. Pages can flip for a number or percentage of additional pages before stopping flipping. The flap can repeatedly (and automatically) do the back and forth motion while flipping or can remain stationary.

Figure 4:
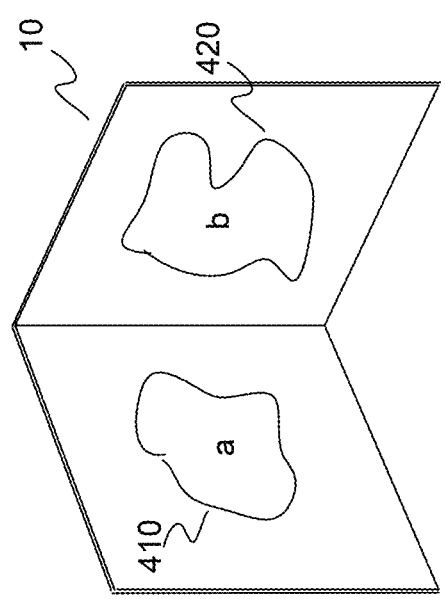
FIG. 4 illustrates an action associated with a deformation characteristic in one embodiment.

FIG. 4 illustrates an action associated with a deformation characteristic in one embodiment. In some embodiments, system 10 is a foldable-bendable display device used for the purpose of comparing physical/haptic characteristics of two objects 410 and 420, each displayed on one of the two flaps of the flexible display. System 10 stores physical property information about each of object 410 and 420. Using programmable kinesthetic haptics, the bending stiffness/resistance of each flap can be mapped to the physical properties of the corresponding object displayed. Vibrotactile haptics can also be used to model the physical properties of the corresponding displayed objects as they are manipulated. Therefore, the user can examine the physical properties, and in particular a stiffness of the objects displayed side by side. As the user manipulates each flap of system 10, the bending stiffness/resistance of each flap can vary according to the bend point of the display, the object location on the display, and the physical properties information for the object. For example, when an object is stiff at a particular place on the object, then bending the flap at that point will meet with greater resistance than bending the flap at a point where the object is not as stiff. Further, the physical properties of the objects can change based on the input. For example, if object 410 is glass, then kinesthetic haptics can make the bendability of the flap stiff where the object is displayed. If the user bends the flap anyway, the image could react by breaking as if it were real glass and provide vibrotactile haptics to accentuate the glass breaking effect. The bending characteristic can be changed to suit the new physical characteristics of broken glass object 410.

Figure 5:
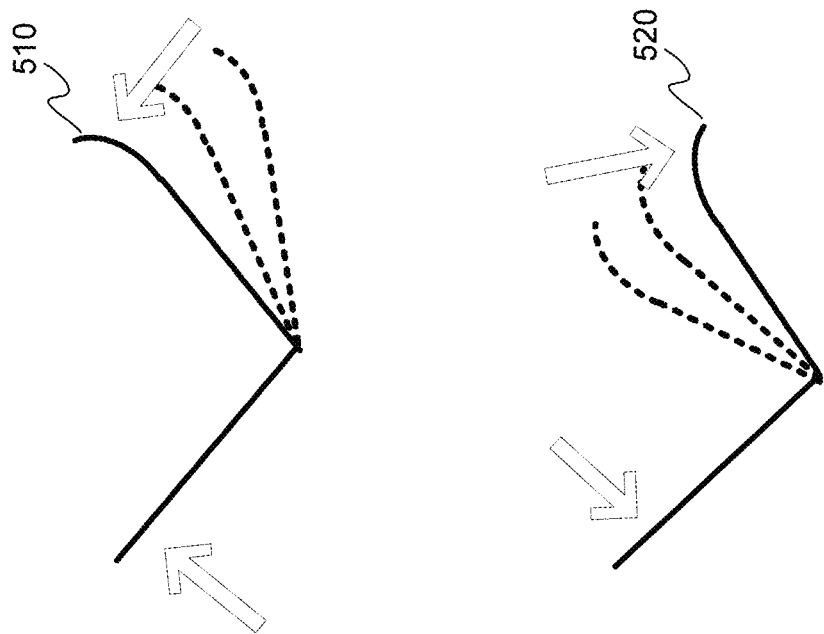
FIG. 5 illustrates an action associated with a deformation characteristic in one embodiment.

FIG. 5 illustrates an action associated with a deformation characteristic in one embodiment. In some embodiments, the gesture of completely folding open or folding close of the display can be haptically augmented using tactile feedback, to emulate a snap-close or a snap-open metaphor. This can simulate the haptic feedback experience when opening or closing a real book, newspaper, magazine, etc., such as snapping a book open or closed. In 510, the user folds the display closed in order to close an application or close a book. The angle in 510, θ, can change toward zero as the flaps are closed. In 515, at some angle, θ', the deformation characteristic can be interpreted as a book closing and kinesthetic actuators can control the angle of the flap to take over the closing of the flaps. At the point where the angle θ equals zero or the system determines the flaps are closed, additional vibrotactile and auditory haptic feedback can be provided that resembles the real world scenario of closing a book. In 520, a user folds the display open in order to open an application or open a book. The angle in 520, θ, can change toward 180 degrees as the flaps are opening. In 525, at some angle θ', the deformation characteristic can be interpreted as a book opening and kinesthetic actuators can control the angle of the flap to take over the opening of the flaps. At the point where the angle θ increases from zero to a positive number or the system determines the flaps are opening, additional vibrotactile and auditory feedback can be provided that resembles the real world experience of opening a book.

Figure 6:
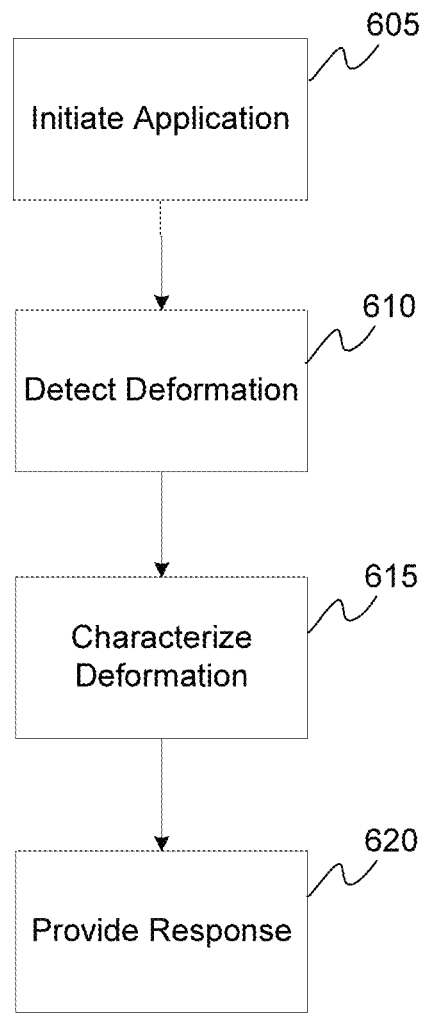
FIG. 6 is a flow diagram illustrating the providing of haptic feedback in a foldable-bendable device in accordance with some embodiments.

FIG. 6 is a flow diagram illustrating the providing of haptic feedback in a foldable-bendable device in accordance with some embodiments. In some embodiments, the functionality of the flow diagram of FIG. 6 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 605, an application is initiated on the device. The application can be any software program that operates on the foldable-bendable device. For example, the application can be an e-reader application for reading materials that may be traditionally printed on paper, such as books, magazines, paper pads, etc. The application can be configured to specifically work in an environment that provides haptic feedback on a foldable-bendable display device. At 610, one or more sensors located on the foldable-bendable display registers a change in properties, indicating a deformation of the display. The deformation can include bending or warping of the flaps or one of the flaps and/or changing the angle between flaps (opening angle). The one or more sensors can each provide individual measurements, which can then in turn be analyzed to characterize a user's actions at any given time or over a period of time. At 615, based on the values of the one or more sensors, the deformation is characterized to establish what type of action a user is performing on the foldable-bendable device. Values of the one or more sensors can be compared to values of the one or more sensors at different times. For example, the value of a sensor detecting the opening angle between two flaps can be compared to the value of the same sensor one second, two seconds, or n seconds before to help characterize the deformation. The system can continue to monitor the one or more sensors until the deformation can be characterized. At 620, when the deformation has been characterized, the system provides haptic feedback based on the characterization of the deformation. Such haptic feedback can include vibrotactile or kinesthetic feedback. The haptic feedback can also be coordinated with visual or audio feedback. For example, in a page flip gesture, a graphic or sound of a flipping page can coincide with vibrotactile or kinesthetic feedback. The system can continue to monitor the one or more sensors to model additional deformation characteristics.

Bend sensors, such as sensor 17, can detect bending actions in one edge and its two corners such as bending the edge up, bending a corner down, bending a corner up, bending both corners up and in, bending the edge back, and bending both corners back and in thereby bending the middle edge upward. One skilled in the art will recognize that other bending actions can be sensed in a similar manner as these bending actions, including similar bends to other edges and corners and bends to the surface of the display away from edges and corners.

Bend sensors, such as sensor 17, can measure a voltage response in the sensor over a time period. The voltage response can indicate in the sensor whether no bending is sensed, slight bending is sensed, or strong bending is sensed. These values over time can indicate particular gestures as deformation changes over time. Also, additional sensors, such as sensor 17, can be used to provide additional data reference points to obtain bending and deformation characteristics over different points on bendable-foldable display 10.

Fold sensors, such as sensor 17, can detect folding actions at a hinge, in accordance with some embodiments. Types of folds that can be detected include no fold (flat), a symmetrical downward fold, a symmetrical upward fold, a fold from the back flap to the front flap to close, a fold from front flap to open the back flap, a fold from the back flap to the front flap backwards, a fold from the front flap to the back flap to open in reverse, a continuous fold in an up and down manner, and a complete fold closed. Forms of folds include a center fold where each flap is about the same size, a partial fold where each flap may be different sizes so that the hinge appears to be offset from center, and various combinations for embodiments with more than two flaps. Touch sensors, such as touch sensor 11, can be used in conjunction with a fold sensor to sense one handed folding, two handed folding, single finger, and multi-finger folding. The data from sensor 17 capturing folding sensing can be charted over time to determine deformation characteristics. Also, additional sensors, such as sensor 17, can be used to provide additional data reference points for bending characteristics to define deformation actions on bendable-foldable display 10.

Different interactions with a bendable-foldable display can map to deformation characteristics similar to a non-digital analogue. For example, in a book reading application, the action of folding open a flap of bendable-foldable display 10 may correspond to opening or closing the cover of a book. The action of sliding a finger down the edge while holding bendable-foldable display 10 slightly open may correspond to adjusting the starting point of page retrieval. The action of bending and releasing the corner of bendable-foldable display 10 may correspond to turning a page. The action of gently bending the edge back of bendable-foldable display 10 while folding the flaps slightly more closed may correspond to leafing through pages slowly. The action of greatly bending the edge back of bendable-foldable display 10 while folding the flaps slightly more closed may correspond to leafing through pages quickly. The action of holding both flaps of bendable-foldable display 10 slightly closed while bending both edges slightly back may correspond to placing a book face down. The action of folding the flaps of bendable-foldable display 10 and swiping near the hinge may correspond to inserting a bookmark. The action of holding one finger on one flap and sliding another finger down the edge while holding the flaps slightly closed may correspond to turning pages while keeping a finger between pages at a point of interest (finger bookmark). One of skill in the art will understand that these actions can map to different functions in other applications. For example, an application for a photo album may use the same actions to determine different interactions with the application.

Figure 7:
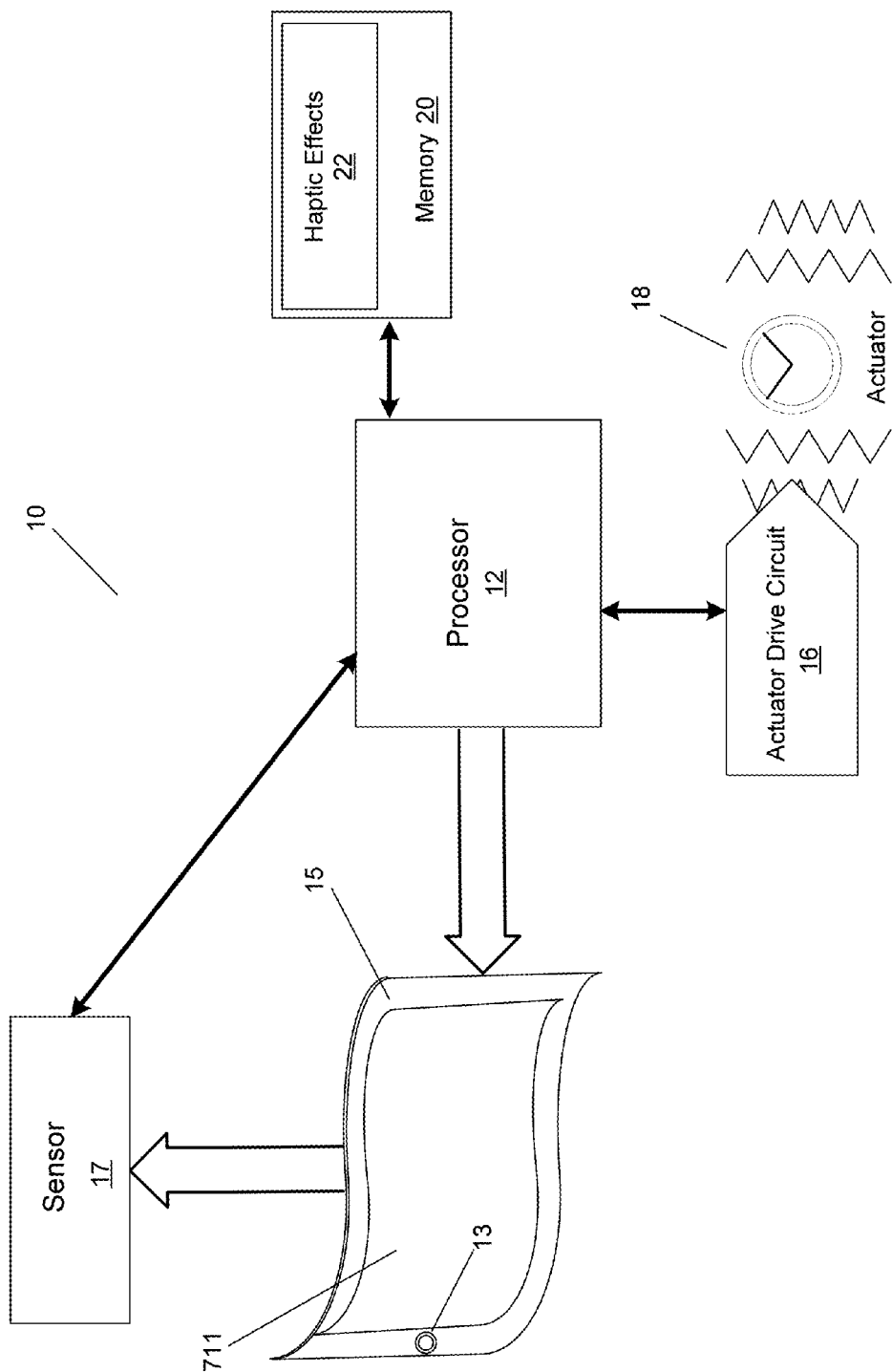
FIG. 7 is a block diagram of a haptically-enabled system in accordance with one embodiment of the present invention.

FIG. 7 is a block diagram of a haptically-enabled system 10 in accordance with one embodiment of the present invention. System 10 includes a touch sensitive flexible surface 711 or other type of user interface mounted within a housing 15, and may include mechanical keys/buttons 13. Internal to system 10 is a haptic feedback system that generates vibrations on system 10. In one embodiment, the vibrations are generated on touch surface 711. Note that the description above with respect to FIG. 1 applies equally to FIG. 7, except that the surface 711 is flexible so that it can be bendable, foldable, rollable, or any combination thereof. Perceived physical properties of flexible surface 711 can be changed to be formed to be very flexible (like a sheet of paper) to nearly rigid (with only a few degrees of flexibility). Embodiments include where the display is partially flexible (rigid in some parts and deformable in some other parts). Embodiments include where the display is non-uniformly elastic and can use kinesthetic haptics to provide perceived uniform and consistent elasticity and deformability. Embodiments also include the reverse, where kinesthetic haptics can provide varying perceived elasticity across a surface with naturally homogeneous elasticity.

Flexible displays are one of the fundamental building blocks of organic user interfaces and can potentially enable digital user interactions that are more intuitive, realistic, and comparable to those occurring in real world. Except for the permanently conformed class of bendable displays, interactions with flexible displays such as flexible display 711 involve deforming (bending, folding and rolling) the display as an input gesture. Such deformations provide a continuous (analogue) directional information entry mechanism which can be expanded into several input dimensions. For example, a "bending" gesture can be expanded into bending along the width/length/diagonal, bending the corners, and so forth.

Deformation-based interactions with flexible displays already offer some level of (natural) haptics. For example, in a bendable device without any haptic augmentation, the device will provide a natural resistance to being bent. However, the natural, uniform, and continuous tactile feedback resulting from deformation interactions does not carry information about the events occurring in the digital world and is not programmable. Enhancement of the haptic experience can be accomplished by augmenting the natural haptics related to continuous (analogue) deformation input dimensions with flexible displays through programmable vibrotactile and kinesthetic haptics.

While natural deformation interactions are similar to those in real world, synthetic haptics holds the potential to offer an intuitive way to convey detailed information about the digital environment. Augmenting the natural/intuitive deformation interactions with synthetic programmable tactile feedback allows feedback that translates the information about the results/consequences of the deformation input in the digital world into haptics.

Figure 8:
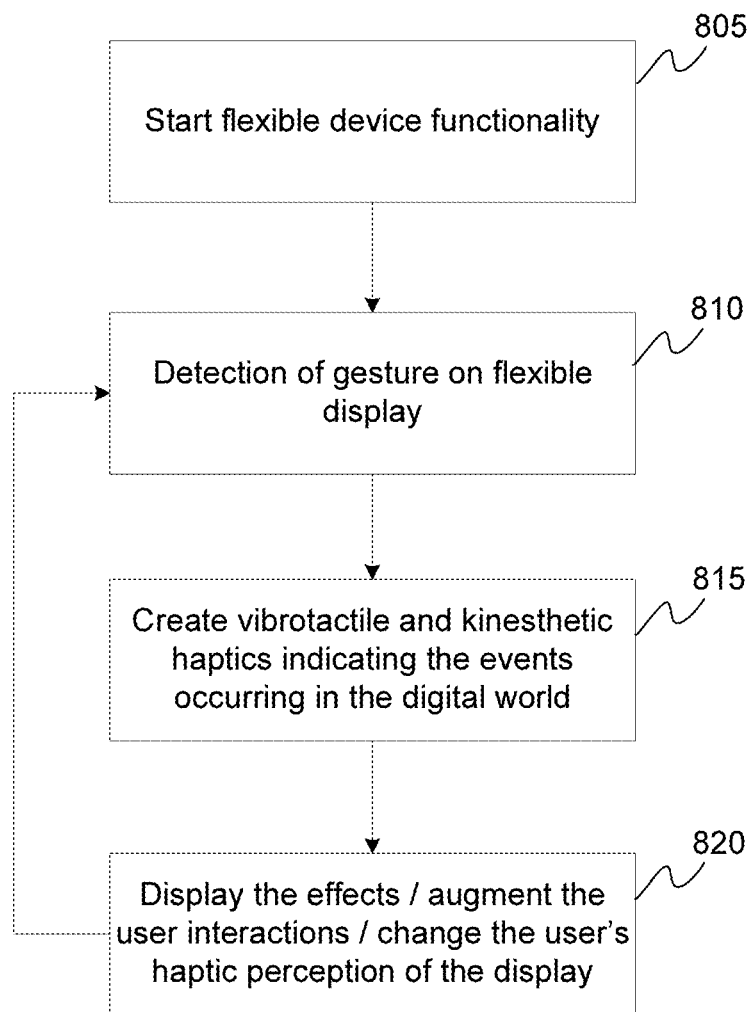
FIG. 8 is a flow diagram illustrating the augmenting of haptic feedback in a flexible device in accordance with some embodiments.

FIG. 8 is a flow diagram illustrating the augmenting of haptic feedback in a flexible device in accordance with some embodiments. At 805, the flexible device functionality is started. This can include launching an application or interface that can haptically respond to the gestures of a user on a flexible display, such as flexible display 711. At 810, a detection of a gesture occurs on the flexible display by a sensor such as sensor 17. Gestures can include deforming of the flexible display by bending, folding, or rolling the display. Gestures can include deforming the flexible display in free space, by for example, waving the display like a flag. Gestures can also include touch gestures that are done in conjunction with deforming gestures. Gestures can include pressure applied to a deformable surface, but without actual deformation.

At 815, vibrotactile or kinesthetic haptics are produced based on the gesture and based on the state of the application or interface on the flexible display. The state of the application or interface provide the context to the user about the events occurring in the digital world, i.e., on the display. Vibrotactile haptics can include any effects that can be played by one or more vibrotactile actuators in the display device or worn by a user of the flexible display device. Kinesthetic haptics include any effects that produce movement of the flexible display device or alter the perceived physical characteristics of the flexible display.

At 820, the effects of the gesture are carried out on the application or interface. This includes displaying the haptic effects, e.g., displaying a vibrotactile response; augmenting the gesture, e.g., providing kinesthetic haptic feedback to the user; and changing the haptic perception of the display, e.g., including a vibrotactile cue in conjunction with updating a visual or auditory output of the display based on the interaction. For example, an application may be displaying a picture on flexible display 711. Deformation of the display in a particular way can cause a vibrotactile sensation to provide feedback indicating that a command was received, a kinesthetic response to make the display flat again, an auditory feedback to give notice that the picture displayed is changing, and a visual feedback to advance the picture displayed to the next picture in a gallery. The system continues to monitor sensor 17 and other input mechanisms for additional input. Thus, vibrotactile and kinesthetic haptics can be employed to confirm the completion/accomplishment of an interaction.

In one embodiment, the user can interact with a flexible portable digital device running an e-book application. The device is equipped with a flexible (bendable) display interface. In a known application, the gesture of bending the corner of the display can be mapped to leafing through the pages the e-book in the digital environment. The bendable display can also be equipped with whole-body vibrotactile haptics functionality. As the user gradually bends the corner of the display, the pages of the e-book flip. The rate of the page flip can correlate with the extent of bending/bending angle.

However, neither the magnitude nor angle of deformation nor the bending stiffness or resistance force (i.e., the natural haptics) provides the user with a direct one-to-one mapping with the number of pages flipped and/or the rate of the page flip. In some embodiments, the corner bending gesture can be augmented with vibrotactile programmable detents, where each detent (haptic click) indicates a single (or a certain number of) page flip(s). The number of tactile detents, therefore, haptically informs the user about the number of pages flipped, and the rate of detents presents a tactile indication of the relative pace of browsing through pages. Adding this type of vibrotactile feedback to the interface allows the user to establish a mental model between the haptic sensation (deformation augmented with synthetic haptics) and the event (page flip) occurring in the digital environment.

Figure 9:
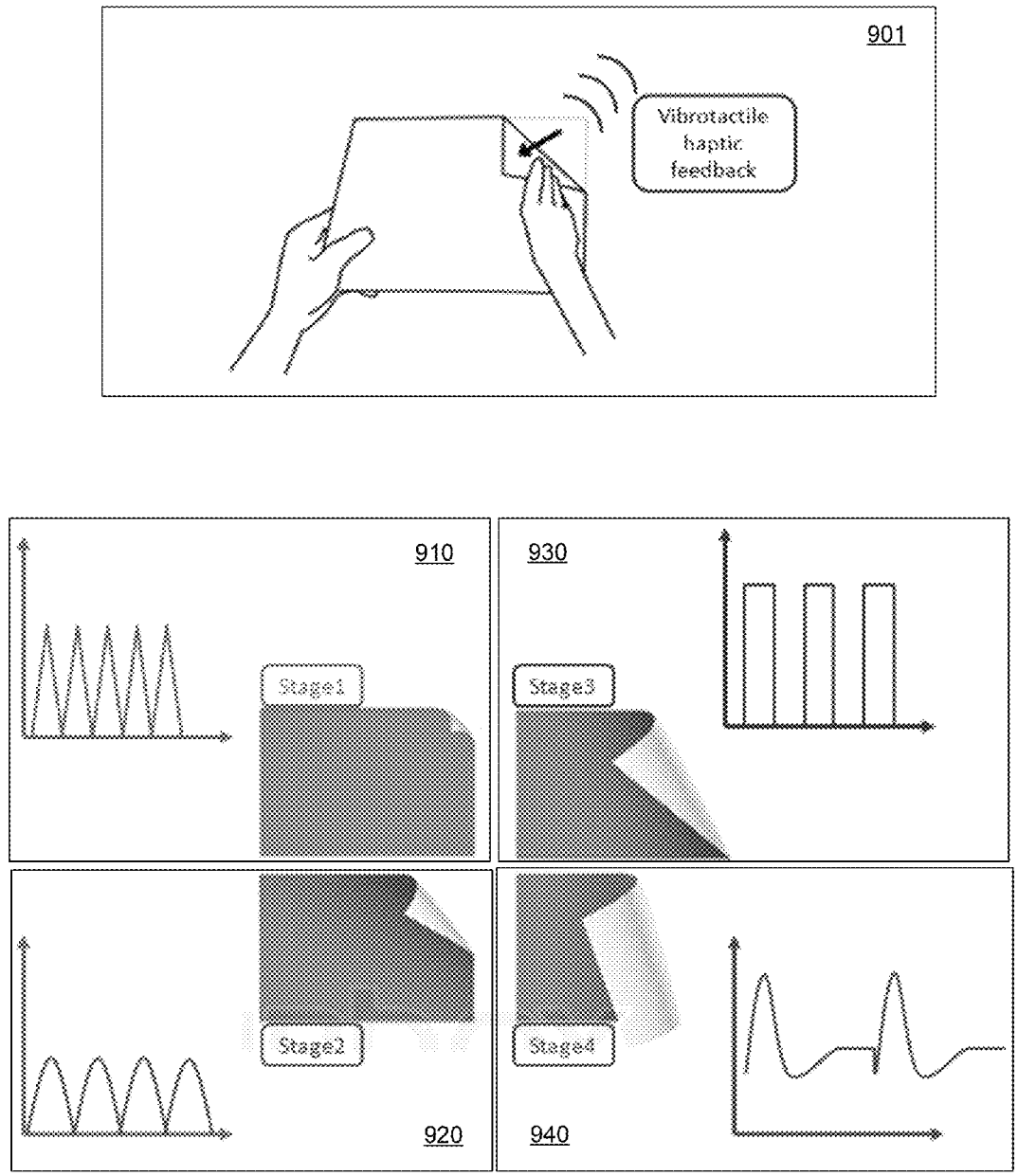
FIG. 9 illustrates an action associated with a deformation characteristic in one embodiment.

FIG. 9 illustrates an action associated with a deformation characteristic in one embodiment. In 901, a user bends the corner of a flexible (bendable) device. A haptic response is played in the form of a vibrotactile feedback. The corresponding interaction mapping, however, depends on the range/threshold of bending magnitude. Four different mapping schemes are distinguished in FIG. 9. Each stage corresponds to a certain bending angle range, e.g., stage 1 (at 910) if bending angle lies between 0 and 10 degrees, stage 2 (at 920) between 10 to 20 degrees, stage 3 (at 930) between 20 to 30 degrees, and stage 3 (at 930) between 30 to 40 degrees, and so forth. Each stage can have a different functionality or mapping associated with it. For example, in a photo browsing application, bending the corner of the device (back and forth) between 0 to 10 degrees (910) can be mapped to scrolling through a set of pictures. Bending the corner of the device beyond 10 degrees up to 20 (920), can allow the user to continuously zoom in/out the pictures. In stage 3 (930), the user can use the bending gesture to adjust the brightness of the picture. Finally in stage 4 (940), bending input can be used to alter the transparency of the picture. In this embodiment, the type, strength and pattern of the tactile effects delivered to the user can be different for each stage, as indicated in the graphs accompanying each of stages 910, 920, 930, and 940. Haptics not only augments the continuous interaction in each stage, it also helps the user distinguish between different stages/mapping schemes related to various functionalities. Moreover, the transition between the stages can be haptically marked to provide the user with further tangible insight as to differentiating between the stages. In other words, the user can use haptic marks to explore among various functionalities without necessarily resorting to audiovisual cues. One skilled in the art will understand that although bending angle is used as the range distinction parameter in the above example, the particular bending angles can be chosen differently and other parameters such as force, etc., could also be used for this purpose.

In other embodiments, the continuous "folding" gestures applied to a foldable display can likewise be haptically augmented using programmable detents as described above. The use of vibrotactile feedback effects is not limited to detents, and in fact any type of appropriate vibrotactile effects could be employed to augment the interactions.

Similar to vibrotactile feedback, kinesthetic haptics can offer value in similar or different contexts, by augmenting the interactions. Examples of methods to kinesthetic haptics include programmable stiffness display (stiffness control), structural damping (damping factor resisting bending, folding, and other deformation degrees of freedom), etc. Feedback can be a combination of both vibrotactile haptics and kinesthetic haptics.

In some embodiments, the natural or structural stiffness and damping of the materials used in flexible displays can be augmented with programmable haptic stiffness control to enrich the deformation gesture language and enhance the effectiveness of the interface. For example, in one embodiment, the user can use bending deformation gestures to browse through his/her list of contacts. As the user becomes closer the end of the list, the haptic stiffness control function can vary the perceived resistance against the deformation, providing the user with a sense of where he/she is in the list. Once the user reaches the end of the list, the haptic stiffness scheme can create a haptic "barrier" by making the display non-deformable/rigid in one direction, preventing the user from bending further. Likewise, when the user is far from the end of the list, the display can be made to be less rigid by countering the natural deformation resistance of the device using kinesthetic haptics. In other words, the range of deformation of the bendable display can be controlled using haptics.

Further, kinesthetic stiffness/damping control or vibrotactile effects can be used to haptically mark each item in the list with programmable detents. For example, a different haptic effect/mark can be used when the user passes between different alphabetic groups. The same haptic augmentation could be applied to folding gesture in a foldable display interface.

In one embodiment, the perceived haptic "stiffness" or deformation resistance of the display can be customized and tailored to the requirements of the current application or required functionality. For example, a user may intend to use the bending or folding gesture to fast forward a sound track, but in small increments or time steps. The stiffness of the display can be actively controlled to assist the user to deform (bend or fold) the display in a controlled gradual manner, with the level of bending or folding corresponding to the size of the increments or time steps either as a fixed size increase or as a percentage of the file length.

Turning back to FIG. 7, another embodiment is a system that provides kinesthetic haptic feedback associated with a flexible display to adjust the perceived elasticity or deformability of the display based on the target interaction. Here a devices natural "elasticity" means the ease of flexion, folding, or rolling that a flexible display has in its natural state based on the material properties and build of the device. Although elasticity of the flexible displays sets the stage for enriched gesture language and advanced intuitive interactions, too much flexibility may have negative impact on some user interface interactions, and in some cases will render them infeasible. Some interactions and functionalities may require the screen to be stiffer or even rigid, such as a screen press, while others are better facilitated by higher flexibility or softness of the interface. Embodiments describe a programmable haptic stiffness control mechanism to adjust the elasticity or deformability of the display depending on the target interaction. In other words, depending on the interactions and the target function, the bendable interface becomes more stiff if a more rigid interface is required, or become softer (easier to deform) if user is applying a deformation-based gesture.

One of skill in the art will understand, however, that deformation of the display may not necessarily occur, and the sensory system can capture the force/pressure applied by the user. For example, the kinesthetic haptics can render the display quite stiff, in which case a small amount of force applied by the user will not lead to any physical deformation. However, the system can still provide a vibrotactile or other type of "haptics response" to such interactions by the user, i.e. pressure applied without deformation occurring.

Figure 10:
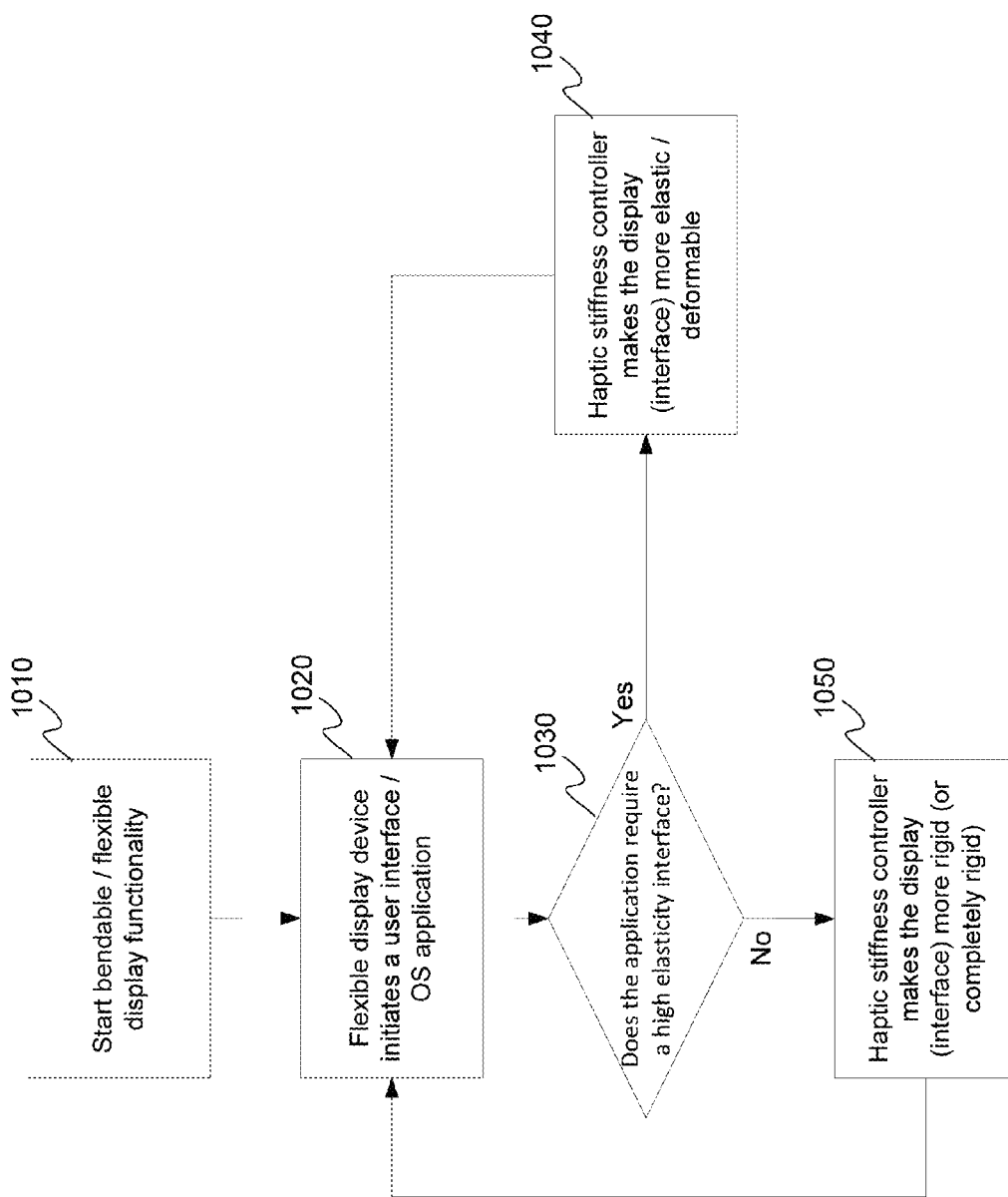
FIG. 10 is a flow diagram illustrating the providing of haptic feedback in a flexible device in accordance with some embodiments.

FIG. 10 is a flow diagram illustrating the providing of haptic feedback in a flexible device in accordance with some embodiments. FIG. 10 illustrates a flow where an application requires a certain stiffness or flexibility of a flexible display which is static while the application is running. At 1010, display functionality is started on a flexible display device. The flexible device can be bendable, foldable, rollable, or a combination thereof. At 1020, an application is started on the flexible display device that has the ability to request a certain elasticity. The application may be a process native to the operating system, such as a home screen, settings screen, or notifications screen, or may be a user-installed application.

At 1030, the flow considers whether the application requires a highly flexible interface. For example, the device could determine whether the intent is to bend the device (requiring flexibility) or interact with the touchscreen (requiring rigidity) based on the location of the touch input. When grasping the edges, the user may be about to bend the device, which should remain flexible. When touching closer to the middle of the screen, the user likely wants to interact with the screen and a rigid surface may be better. The surface can also become rigid when the user interacts with it using a stylus. If a high flexibility is required, at 1040, a haptic stiffness controller, such as actuator drive circuit 16, can make the display more elastic or deformable. Greater flexibility can be achieved by allowing the device to flex naturally or by augmenting the flexion of the device to assist flexion when a user applies bending/folding/rolling force to make it seem "easier" to the user to flex and manipulate the device. If at 1030, the application requires low (or no) flexibility, then at 1050 the haptic stiffness controller can make the display more rigid or completely rigid. Rigidity can be achieved by controlling one or more actuators, such as actuator 18, to resist deformation of the flexible display. When a user switches applications or when a function of the application changes, the flow can repeat back to 1020 from either 1040 or 1050.

Figure 11:
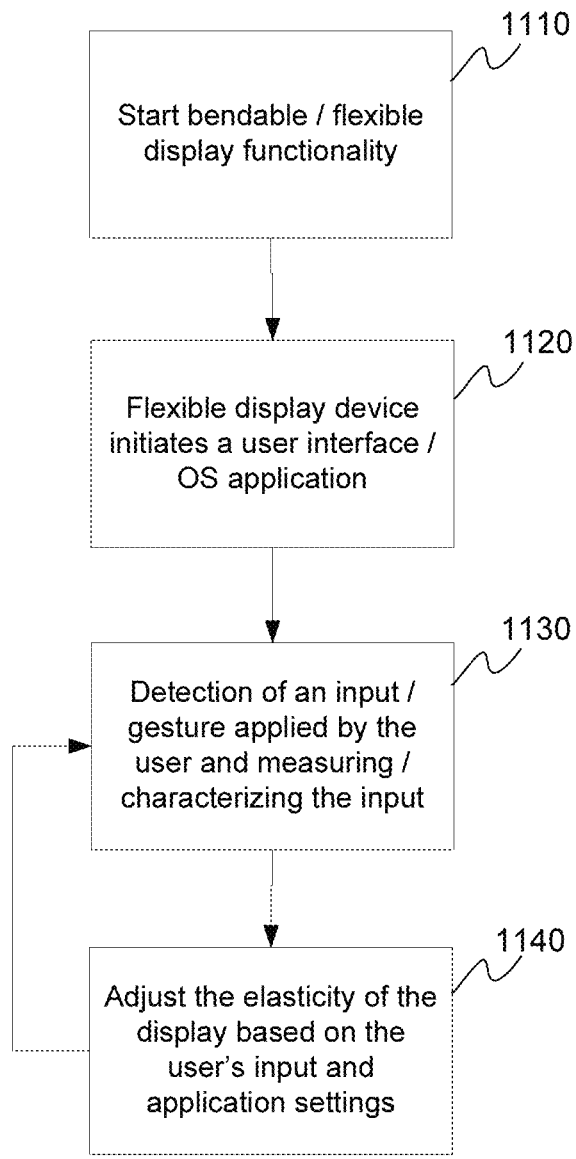
FIG. 11 is a flow diagram illustrating the providing of haptic feedback in a flexible device in accordance with some embodiments.

FIG. 11 is a flow diagram illustrating the providing of haptic feedback in a flexible device in accordance with some embodiments. FIG. 11 illustrates a flow where an application requires a stiffness or flexibility of a flexible display that is dynamically adjustable while the application at running based on a user's interaction with the application and device. At 1110, display functionality is started on a flexible display device. The flexible device can be bendable, foldable, rollable, or a combination thereof. At 1120, an application is started on the flexible display device that has the ability to request a certain elasticity of the display dynamically throughout the course of the application execution. The application may be a process native to the operating system, such as a home screen, settings screen, or notifications screen, or may be a user-installed application. At 1130, an input or gesture is detected by the device through flexible display 717, touch interface 11, or other input interface. The input is measured and characterized by the application. At 1140, the elasticity of the display is adjusted based on the user's input and the application settings. Elasticity can be adjusted to be more rigid or more flexible. Rigidity can be controlled by a haptic stiffness controller, such as actuator drive circuit 16, to control one or more actuators, such as actuator 18, to resist deformation or assist in deformation of the flexible display to make the display more or less rigid, respectively. In some embodiments, the haptic stiffness controller can be controlled to be passive to allow the elasticity to be the same as the natural elasticity of the device. Flow can continue to step 1130 to continue detecting further input and reacting accordingly.

In one embodiment consistent with the flow illustrated in FIG. 10, the rigidity of a flexible display, such as display 711 can be adjusted to be stiffer when a user is inputting text. Applications implementing text entry require the screen to be rigid, otherwise the display deforms away from user's finger every time they want to press a key. Moreover, the shape of the device and spatial arrangements of the keys should remain fixed during the keyboard entry for muscle memory to be effective during writing. As soon as the user launches the keyboard entry application, the haptic controller can stiffen the display, making it suitable for the function (facilitating typing interactions).

In another embodiment consistent with the flow illustrated in FIG. 11, the flexible display can be equipped with embedded strain gauges and force sensors, such as sensor 17, which can characterize the deformation and force inputs applied by the user, and a pressure-sensitive touch screen, such as touch surface on 711, mounted on the flexible display. The device in its original mode can be rigid, allowing the user to interact with different OS/interface functions. However, when the user applies a bending force or touch pressure beyond than a certain value or threshold, the device can switch to become deformable or less rigid. Therefore, the user can command the device to become soft when a softer interface is required, but can take advantage of rigidity of the display in other scenarios. Flexible devices can be damaged by excessive deformation. Thus, in another example, haptic feedback can be used to warn users when they are about to exceed the maximum deformation supported. The device can become rigid, and produce an abstract but unmistakable warning with vibration, or produce a squeaking sensation with granular synthesis that intuitively communicates that it is bending too much. This input monitoring and dynamic elasticity adjustment facilitates interactions with flexible displays across a variety of functionalities, rendering the interface more effective for both the interactions that require a soft display as well as those requiring a stiffer one.

In another embodiment, the flexible display can be deformed and maintained in a wearable configuration. In this embodiment, to be able to wear the device on certain location of the body (e.g., wrist) ergonomically, the user can deform the device to make it conform to the shape of the body (e.g., bends it around his/her wrist). However, once the device is bent around the wrist, it can be made to become rigid or stiff to stay in place as a wearable portable device. Increasing the stiffness of the display once it is taken the target shape allows the user to make the display into physical shapes that are appropriate for certain functions, and make the display hold its shape for whatever time is required.

In another embodiment, the flexible display can be deformed according to a gaming console application that can be wearable or take on a shape suitable for interaction with the game. Here, the flexible display, such as 711, can be separated into a flexible interface and a separate display, where the flexible interface is an interface to a gaming console application.

Turning back to FIG. 7, another embodiment is a system that provides shape changing functions of a flexible display. Changing the shape of the display can depend on the type of interaction, as well as the type and the content of the information that is communicated to the user. In one embodiment a flexible display, such as the display of 711, can be haptically augmented to change shape in a self-actuated controlled manner. The purposes for taking a particular shape can include the ability to take the form that is more appropriate for a certain functionality or application and thus facilitates the user interactions with the interface; to display certain information through its geometric shape; to enable functionalities that are only feasible with a certain physical shape; or in cases where the device is serving as a physical representation of a virtual object, to deliver a more realistic simulation of the target object by mimicking its shape.

Where shape change indicates information, one can inspect the device either visually or haptically to view or experience the shape change to receive the information (without the need to discern through detailed examination visually or aurally). For example, a device that is flat may have no new messages or notifications while a device that is bent may have new messages where the degree of bending indicates the number of messages. This can be visually seen without inspecting in detail or by interacting with the device, for example in a user's pocket.

Figure 12:
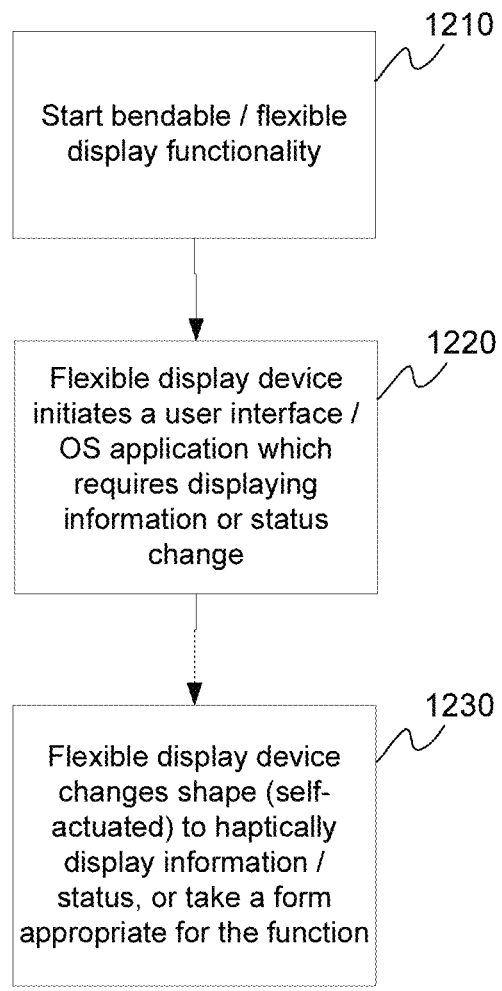
FIG. 12 is a flow diagram illustrating the providing of haptic feedback in a flexible device in accordance with some embodiments.

FIG. 12 is a flow diagram illustrating the providing of haptic feedback in a flexible device in accordance with some embodiments. At 1210, display functionality is started on a flexible display device. The flexible device can be bendable, foldable, rollable, or a combination thereof. At 1220, an application is started, resumed, or notified on the flexible display device which requires displaying information or represents a status change and that has the ability to request a certain shape of the device. The application may be a process native to the operating system, such as a home screen, settings screen, or notifications screen, or may be a user-installed application. At 1230, the flexible display device changes shape by itself to haptically display information or status of the device, or to take a form appropriate for the function.

For example, in one embodiment the flexible display can be a bendable or foldable phone which bends or folds when there is an urgent incoming call. The call would arrive and the phone could recognize the caller or determine urgency, and change its shape to signify the urgency of the call or person calling. Similarly, the flexible display can change its shape in a way that the physical form of the device better matches the content/info displayed. For example, the user can initiate a photo browsing application. As soon as this application is initiated, the flexible device can take the form of a picture frame with a stand, to more realistically simulate a photo viewing interaction (making the user experience closer to real world interactions), and also facilitate the functionality for the use.

Referring again to FIG. 7, another embodiment includes bend-sensors and actuators, such as sensor 17 and actuator 18. In one embodiment, a flexible display, such as LG Corporation's "G Flex" phone can have a bend sensor attached or integrated into its design, such as sensor 17, as well as sensor reading and processing circuitry such as processor 12 and so forth. The "G Flex" is a curved phone that can slightly bend and includes an integral vibrotactile haptic device. The bending sensor values can be sensed using an interface directly connected or connected via Bluetooth to the phone or display. Mounting an actuator directly on a flexible surface can prevent it from bending at the mounting location, or can cause the mounting to fail. For example, relatively large actuators can become unglued or unattached from the flexible surface over time. This issue can be overcome by attaching a much smaller fixture (one with less surface area contact with the bending surface to oppose the bending direction) to the flexible surface, and then attaching the actuator to it, thereby positioning the larger actuator away from the surface so that the actuator does not inhibit the bending surface. One solution can be to use a stud or post attached to the flexible device and glue or attach the actuator to the stud or post head. In some embodiments the actuator can slide up the post or stud as the bending surface begins to contact the actuator. Thus, a small, rigid mounting fixture can securely attach actuators without hindering the bending of the surface. In devices that bend in only one direction the small fixture can be thin in the direction perpendicular to the bending direction. In devices that bend in all directions, the small fixture can be circular in shape at the contact point.

In another embodiment, actuators, sensors, and so forth from FIG. 7 can be integrated into a flexible surface as an input device to a display. In other words, the flexible display of 711 can be split into a flexible surface and a display (not shown). A user can gesture with the input device by deforming the surface, including bending or twisting the surface or bending the corners. Graphics can be shown on a nearby phone or display by transmitting the gestures to the display, wirelessly or wired. The graphics can be controlled and updated by deforming the flexible surface.

In embodiments using either the flexible surface or flexible display, such as the "G Flex", haptic feedback can also be generated on the flexible surface or display, as in the following examples. A short burst of vibration can be emitted when a bending threshold is reached, creating the sensation of a "pop," as if the surface was bi-stable and had snapped into another position. This idea can be used to indicate any sudden change in state, such as breaking an object in two, like with snapping a glow stick, a Hershey's "Kit Kat," and so forth. In another example, short bursts of vibration can be emitted at specific points in the bending range to give the impression of detents. For example, detents could be emitted when the surface bends by 25%, 50%, 75% and 100%.

In another example, granular synthesis can be used to create the impression of creaking or to provide the illusion that the surface is bending more than it actually is by outputting a short burst of vibration every time the bending of the surface changes by a particular granular amount. Short bursts of vibration (e.g., 10 ms) can be outputted every time the bend changes by a specific amount (e.g., 30 grains over the range of bending). This can be done to create at least two effects. First, the settings can be adjusted to simulate different textures. This can give the impression, for example, that the user is bending a wood, plastic, or glass surface of different thicknesses. Second, the creaking can also give the impression that the surface is bending more than it really is. This is important in transitional devices as flexible devices become more widely available and then more flexible. A flexible but stiff device can feel as if it was much more flexible than it really is.

One embodiment using these techniques includes a glow stick shown on the screen. As the surface or device is bent, it first creaks using a haptic playback device. As the glow stick creaks and the surface or device is bent, the display of the glow stick shows the glow stick starting to bend in accordance with the sensed bend pressure provided by the user. When the illustrated glow stick can bend no more without snapping, a snapping sensation is felt using a haptic playback device. The application responds and the glow stick lights up.

Another embodiment using these techniques includes a camera app shown on the screen. Bending the phone display or surface can control either the focus or the zoom. Continuous haptic effects can be outputted to emulate the mechanics of the camera.

Another embodiment using these techniques in a slightly bendable device, such as the "G Flex" or bendable surface, includes an e-book app shown on screen. Pages can be flipped one by one when bending the edges or corners of the surface. Confirmation feedback can be outputted on each flip. Alternatively, the surface can be bent and held in place, which can cause the pages to continuously flip at a fast rate. A haptic effect can be played to allow the user to feel the flipping of the pages. Further, similar to earlier in the application, the application can close or open the book when the device is bent one way or the other past a threshold.

As disclosed, embodiments implement a kinesthetic and vibrotactile haptic feedback system in flexible devices, including a foldable-bendable display device. Deformation input associated with a user's actions may be used, based on an application running on the device, to determine deformation characteristics of the device and thereby provide appropriate kinesthetic and vibrotactile feedback to the user. Such feedback includes effects useful when using the device as an e-reader, such as a single page flip effect and a page browse effect. Such feedback also includes effects useful when comparing objects, one on each flap of the display device. Such feedback also includes effects useful when opening and closing the folds of the device. Such feedback also includes augmentation of the device to increase or decrease device rigidity or provide feedback based on an application on the device and the deformation or deformation pressure placed on the device.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A haptic effect enabled bendable-foldable display comprising: a first flexible flap and a second flexible flap coupled by a hinge; a haptic output device; a sensor electronically coupled to the first flap and the second flap to receive a folding characteristic signal based on a value of an opening angle between the first flap and the second flap, and to receive a bending characteristic signal of the first flap based on an amount of a bend radius of the first flap; and a drive circuit electronically coupled to an actuator configured to produce a haptic effect based on the folding characteristic signal and the bending characteristic signal, wherein the bending characteristic signal corresponds to an action of flexing a bendable portion of the first flap and the folding characteristic signal corresponds to an action of opening the hinge; and wherein the haptic output device provides kinesthetic feedback of the hinge in response to the folding characteristic signal and kinesthetic feedback of the first flap in response to the bending characteristic signal.

2. The bendable-foldable display of claim 1, wherein the drive circuit, based on the sensor detecting a sequence of signals comprising a touch pressure, an increase in the bend radius, and a decrease of the opening angle, generates a particular haptic feedback.

3. The bendable-foldable display of claim 1, wherein the kinesthetic feedback of the hinge modulates stiffness of the opening based on application settings for an application on the device and the folding characteristic signal; and wherein the kinesthetic feedback of the first flap modulates stiffness of the flexing based on application settings of the display and the bending characteristic signal.

4. The bendable-foldable display of claim 1: further comprising: memory to store the folding characteristic signal as a pre-fold status signal prior to a change in the folding characteristic signal, wherein after the change in the folding characteristic signal, the drive circuit controls the hinge to produce approximately the pre-fold status signal as the folding characteristic signal, and wherein an application on the device provides a visual change corresponding to the changing folding characteristic signal.

5. The bendable-foldable display of claim 1, further comprising: memory to store the folding characteristic signal as a post-fold status signal after a change in the folding characteristic signal; memory to store the bending characteristic signal as a post-bend status signal after a change in the bending characteristic signal, wherein upon a change in the folding characteristic signal and change in the bending characteristic signal indicate a minimal value of bending and a small opening in the hinge, the drive circuit controls the hinge to produce approximately the post-fold status signal as the folding characteristic, and wherein an application on the device provides a visual change corresponding to the changing folding characteristic signal.

6. The bendable-foldable display of claim 1, wherein the drive circuit controls the device in response to an application on the device that displays an object on the first flap of the display, wherein the application contains physical property information about each object displayed, wherein the drive circuit provides kinesthetic feedback in response to the bending characteristic signal of the first flap to stiffen or relax bendability of the first flap based on the physical property information of the object displayed on the first flap.

7. The bendable-foldable display of claim 6, wherein the drive circuit further:
controls vibrotactile feedback in response to the application on the device, wherein the vibrotactile feedback provides a haptic response based on input from a touch sensor.

8. The bendable-foldable display of claim 1, wherein the folding characteristic signal changes indicating a change in position of the hinge indicating that the foldable portion of the device is closing, and wherein the drive circuit produces, prior to the closing of the foldable portion, kinesthetic feedback to control the foldable portion closed.

9. The bendable-foldable display of claim 1, wherein the folding characteristic signal changes indicating a change in position of the hinge indicating that the foldable portion of the device is opening, and wherein the drive circuit produces, prior to the opening of the foldable portion, kinesthetic feedback to control the foldable portion open.

10. The bendable-foldable display of claim 1, wherein the folding characteristic signal changes indicating a change in position of the hinge indicating that the foldable portion of the device is closing, and wherein the folding characteristic signal changes indicating a further change in the position of the hinge indicating that the hinge is closed, and wherein the drive circuit produces haptic feedback on the haptic output device.

11. The bendable-foldable display device of claim 1, wherein the folding characteristic signal indicates that the hinge is fully closed, wherein the folding characteristic signal changes to indicate that the hinge is opening, and wherein the drive circuit produces haptic feedback on the haptic output device.

12. A haptic system comprising one or more haptic output devices integrated into a bendable-foldable display comprising: sensor information receivers for receiving input from one or more sensors indicating deformation of the bendable-foldable display device having a first flexible flap and a second flexible flap coupled by a hinge, wherein the one or more sensors are configured to detect a folding characteristic based on a value of an opening angle between the first flexible flap and the second flexible flap and configured to detect a bending characteristic in at least one flap based on an amount of bend radius of the at least one flap; a processor for determining deformation characteristics of the bendable-foldable display device, wherein the determination is based on the folding characteristic and the bending characteristic; and a haptic feedback generator that generates a haptic feedback based on the deformation characteristics, wherein the deformation characteristics correspond to an action of flexing a bendable portion of the display and opening a foldable portion of the display; and wherein the haptic feedback includes kinesthetic feedback of the foldable portion of the display and kinesthetic feedback of the bendable portion of the display.

13. The system device of claim 12, wherein the haptic feedback generator, based on the sensor detecting a sequence of signals comprising a touch pressure, an increase in the bend radius, and a decrease of the opening angle, generates a particular haptic feedback.

14. The system of claim 12, wherein the kinesthetic feedback of the foldable portion of display modulates stiffness of the opening based on application settings for an application on the device and the deformation characteristics; and wherein the kinesthetic feedback of the bendable portion of the display modulates stiffness of the flexing based on the application settings and deformation characteristics.

15. The system claim 12, wherein: the processor stores pre-deformation position input from the one or more sensors prior to the deformation; and the haptic feedback generator: controls one or more haptic actuators to return the foldable-bendable display near to its pre-deformation position based on the pre-deformation input; and causes an application on the device to provide a visual change corresponding to the deformation characteristics.

16. The system of claim 12, wherein: the processor: stores post-deformation input from the one or more sensors corresponding to a position value for the opening and a flexion value for the flexing, wherein the flexion value indicates a flexing of the bendable display; receives input indicating a change in opening and flexion deformation characteristics, wherein the changed deformation characteristics indicate a minimal value of flexion and a smaller opening at the foldable portion; and the haptic feedback generator: controls one or more haptic actuators to return the foldable-bendable display to an opening position value near to its post-deformation opening position value; and causes an application on the device to provide a visual change corresponding to the deformation characteristics.

17. The system of claim 12, wherein the haptic feedback generator:
controls kinesthetic feedback in response to an application on the device that displays an object on each flap of the foldable-bendable display, wherein the application contains physical property information about each object displayed, wherein the kinesthetic feedback provides a modulated response to deformation characteristics of the bendable flap to stiffen or relax bendability of the flaps based on the physical property information of each object.

18. The system of claim 17, wherein the haptic feedback generator:
controls vibrotactile feedback in response to the application on the device, wherein the vibrotactile feedback provides a haptic response based on input from a touch sensor.

19. The system of claim 12, wherein:
the processor receives input indicating a change in position of each flap, wherein the change indicates that the foldable portion of the device is closing; and
the haptic feedback generator produces, prior to the closing of the foldable portion, kinesthetic feedback to control the foldable portion closed.

20. The system of claim 12, wherein:
the processor receives input indicating a change in position of each flap, wherein the change indicates that the foldable portion of the device is opening; and
the haptic feedback generator produces, prior to the opening of the foldable portion, kinesthetic feedback to control the foldable portion open.

21. The system of claim 12, wherein:
the processor receives input indicating a change in position of each flap, wherein the change indicates that the foldable portion of the device is closing;
the processor receives input that the flaps are fully closed; and
the haptic feedback generator produces haptic feedback on the one or more haptic output devices.

22. The system of claim 13, wherein:
the processor receives input that the flaps are fully closed;
the processor receives input indicating a change in position of each flap, wherein the change indicates that the foldable portion of the device is opening; and
the haptic feedback generator produces haptic feedback on the one or more haptic output devices.

23. A flexible-foldable display device comprising: a first flexible flap and a second flexible flap coupled by a hinge; one or more sensors for detecting a value of an opening angle between the first flap and the second flap; a haptic system comprising one or more haptic output devices, wherein the haptic system: receives input from the one or more sensors indicating the value of the opening angle between the first flap and the second flap and generates haptic feedback based on the value of the opening angle, wherein the haptic feedback comprises a first and a second vibrotactile effect, wherein the first vibrotactile effect is based on a first deformation characteristic comprising a bendable portion of the first flap and the second vibrotactile effect is based on a second deformation characteristic comprising an action of opening the hinge, and wherein the first and second deformation characteristics are non-overlapping ranges of deformation.

24. The flexible device of claim 23, wherein:
the haptic feedback is a kinesthetic feedback to control rigidity of the flexible device to make the device more or less stiff.

25. The flexible device of claim 24, wherein:
the rate of change of an image on the first flap or the second flap is dependent on the opening angle.

26. A haptic system comprising one or more haptic output devices integrated into a flexible display comprising: a first flexible flap and a second flexible flap coupled by a hinge; sensor information receivers for receiving input from one or more sensors indicating a bending deformation of the flexible display device and a folding deformation between the first flexible flap and the second flexible flap, wherein the one or more sensors are configured to determine an amount of bending radius in the display and a value of an opening angle between the first flap and the second flap; and a haptic feedback generator that generates haptic feedback based on the amount of bending radius and the value of the opening angle, wherein the haptic feedback comprises a first and a second vibrotactile effect, wherein the first vibrotactile effect is based on a first deformation characteristic comprising a bendable portion of the first flap and the second vibrotactile effect is based on a second deformation characteristic comprising an action of opening the hinge, and wherein the first and second deformation characteristics are non-overlapping ranges of deformation.

27. The system of claim 26, wherein: the haptic feedback includes a kinesthetic effect.

28. The system of claim 26, wherein:
the haptic feedback is a kinesthetic feedback to control rigidity of the flexible device to make the device more or less stiff.

29. The system of claim 28, wherein:
the rigidity was more stiff prior to characteristic detection of the bending radius and less stiff after the detection of the bending radius.

* * * * *